United States Patent [19]

Mason

[11] 4,356,696
[45] Nov. 2, 1982

[54] TURBOCHARGER COMBUSTOR SYSTEM

[75] Inventor: John L. Mason, Palos Verdes Estates, Calif.

[73] Assignee: The Garrett Corporation, Los Angeles, Calif.

[21] Appl. No.: 137,162

[22] Filed: Apr. 4, 1980

[51] Int. Cl.³ .............................................. F02B 37/00
[52] U.S. Cl. ..................................................... 60/606
[58] Field of Search ........................... 60/605, 606, 274

[56] References Cited

U.S. PATENT DOCUMENTS

| | | | |
|---|---|---|---|
| 2,159,758 | 5/1939 | Diedrich | 60/606 X |
| 3,712,065 | 1/1973 | Hurst | 60/274 |
| 4,018,053 | 4/1977 | Rudert et al. | 60/606 |
| 4,215,549 | 8/1980 | Daeschner | 60/606 |

FOREIGN PATENT DOCUMENTS 2751987 5/1979 Fed. Rep. of Germany ........ 60/606

Primary Examiner—Michael Koczo, Jr.
Attorney, Agent, or Firm—Joseph A. Yanny; Albert J. Miller; Stuart O. Lowry

[57] ABSTRACT

A combustor system for use with a turbocharged combustion engine comprises a combustor connected for continuous passage of engine exhaust gases. The combustor system includes a relatively low pressure fuel injection system for atomizing fuel for combustion in a substantially vitiated atmosphere, a fuel control system for supplying fuel to the combustor in response to engine operating conditions, and a heat exchanger for preheating compressed bypass air prior to supply thereof to the combustor.

10 Claims, 1 Drawing Figure

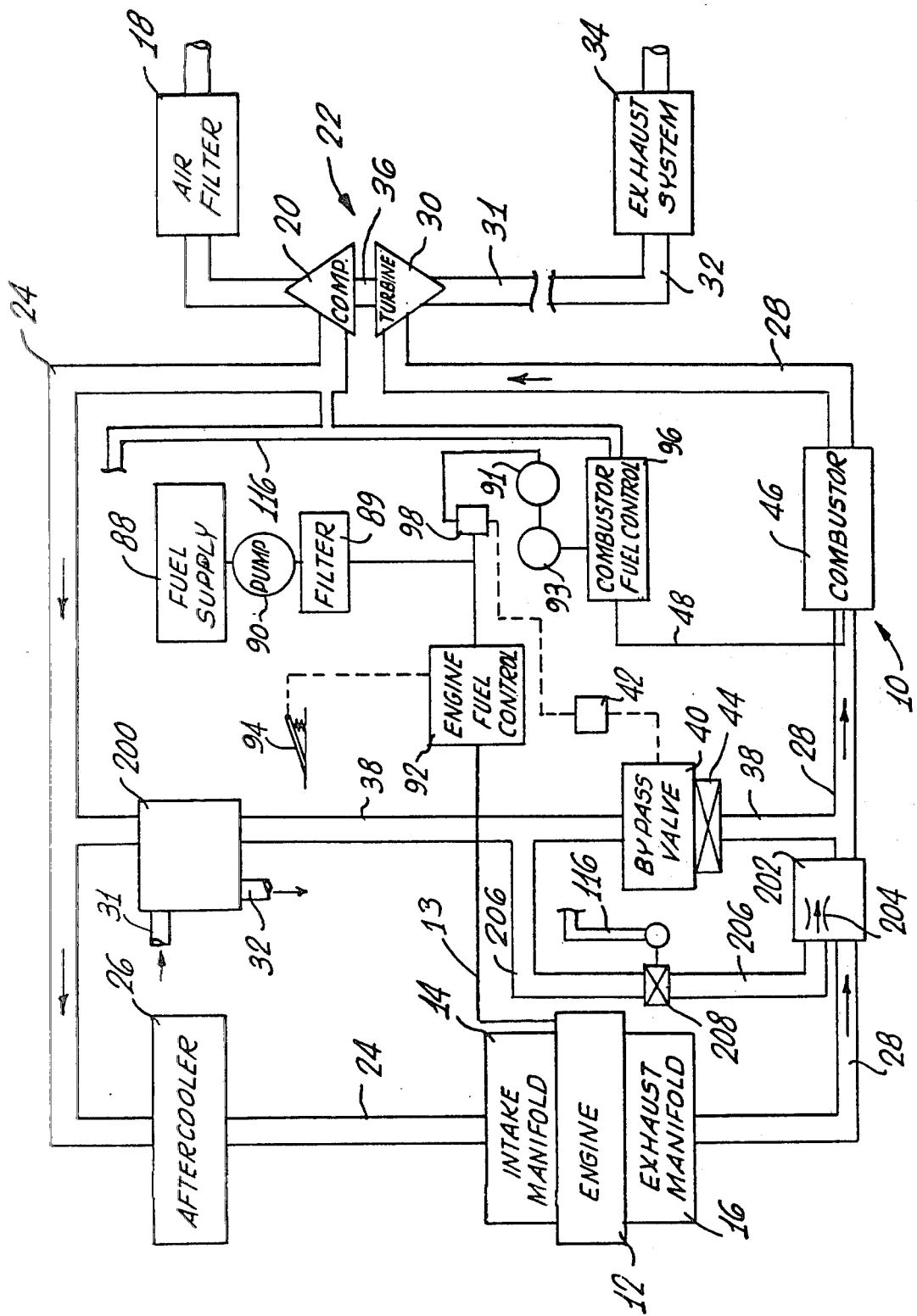

TURBOCHARGER COMBUSTOR SYSTEM

BACKGROUND OF THE INVENTION

This invention relates to auxiliary combustor systems for use with combustion engines. More specifically, this invention relates to an improved combustor system particularly for use with turbocharged reciprocating engines, and for providing closely controlled combustor operation at virtually all engine operating conditions.

Auxiliary combustor systems for use with combustion engines are well known in the prior art. Specifically, such combustor systems are provided with combustion engines such as a turbocharged diesel engine wherein the available energy level of engine exhaust gases at relatively low speed conditions is insufficient to drive the turbocharger to provide the desired turbocharger boost to maintain engine load-carrying capacity. Accordingly, an auxiliary combustor is provided for supplementing the energy level of the exhaust gases supplied to the turbocharger at these relatively low speed conditions, and thereby supplementally drive the turbocharger to provide the desired boost pressure.

Prior art combustor systems have required a supply of fresh charge air to the combustor in order to obtain and maintain propagation of a combustor flame. In this regard, it has been common practice to provide bypass means for bypassing a portion of the compressed charge air from the turbocharger around the engine, and to position the combustor in the bypass means. Importantly, the turbocharger has been sized so that excess charge air is always available whereby fresh air is supplied to the combustor at all conditions of engine operation to maintain a combustor flame. See, for example, U.S. Pat. Nos. 3,048,005; 3,570,240; and 3,996,747. However, with these systems inefficient quantities of fuel are burned in the combustor in order to maintain the desired high energy level of gases flowing through the combustor. Moreover, secondary ignition of any fuel remnants in the engine exhaust gases is not possible.

Other prior art combustor systems have attempted to connect a combustor in series, or in-line, with exhaust gases exiting the engine. In this manner, the energy level of the exhaust gases is boosted for supplementally driving the turbocharger, and any remnants of unburned fuel in the exhaust gases are ignited to reduce system smoke and emissions. However, in the prior art, it has been found that the ignition and sustainment of a flame in the in-line combustor is particularly difficult in the substantially vitiated exhaust gas atmosphere. See, for example, U.S. Pat. Nos. 2,620,621; 2,633,698; 3,736,752; 3,849,988; 3,949,555; 3,988,894; 3,996,748; 4,004,414; 4,009,574, and 4,026,115. However, these systems are undesirable in that they, too, require an oversized turbocharger for providing fresh charge air to the combustor at all times to maintain the combustor flame. This continuous addition of charge air to the combustor results in fuel-inefficient combustor operation, but has heretofore been necessitated by the inability of prior art systems to operate without fresh air.

Various attempts have been made to improve the efficiency of operation of prior art auxiliary combustor systems, and thereby at least partially minimize the efficiency penalties inherent in a constant supply of fresh charge air to the auxiliary combustor. One such attempt comprises the inclusion of a heat exchanger for preheating charge air supplied to an auxiliary combustor mounted along a bypass conduit. See for example, U.S. Pat. Nos. 2,620,621 and 2,840,866. Another design attempt includes injector means for injecting exhaust from an auxiliary combustor into the engine exhaust gas stream. However, because these systems still require the constant supply of fresh charge air to the auxiliary combustor, those systems do not provide for optimum fuel efficient operation.

The combustor system of this invention overcomes the problems and disadvantages of the prior art by utilizing apparatus and methods for maintaining controlled fuel-efficient combustion in an in-line combustor without requiring the continuous addition of fresh charge air to the combustor.

SUMMARY OF THE INVENTION

In accordance with the invention, a turbocharger combustor system comprises a combustor coupled in-line between the exhaust manifold of a charge air engine and the driving turbine of a turbocharger. Accordingly, the engine exhaust gases pass continually through the combustor prior to communication with the turbocharger. Conveniently, a charge air bypass valve may be included to control bypass of a portion of the charge air flow around the engine to the exhaust system whenever bypass air is required for combustor operation. Alternately, the turbocharger may be designed so that excess charge air flow bypassing the engine is available when such bypass flow is needed for combustor operation, and is unavailable due to engine air flow consumption when such bypass flow is not required for combustor operation. Bypass air, when available for flow to the combustor, is passed through a heat exchanger for preheating thereof by virtue of extraction of heat from exhaust gases discharged from the turbine in order to increase the total energy level of the gases flowing through the combustor with minimum fuel consumption. Then, the preheated flow is mixed with engine exhaust gases upstream of the combustor for elevation of the temperature of the total exhaust system gas flow prior to supply to the combustor. In one embodiment, the preheated charge air flow is added to the engine exhaust gases by means of a jet pump for positive mixture between the preheated charge air and the engine exhaust gases and for increasing the pressure differential across the engine for improved engine efficiency.

BRIEF DESCRIPTION OF THE DRAWING

The accompanying drawing is a schematic diagram illustrating the turbocharger combustor system of this invention.

DETAILED DESCRIPTION OF THE PREFERRED EMBODIMENT

A turbocharger combustor system 10 is shown generally in the drawing in combination with a turbocharged combustion engine 12, such as a turbocharged diesel engine. As shown, the engine 12 includes a fuel intake 13 and a charger air intake manifold 14. Fuel and air supplied through the intake 13 and manifold 14 are suitably mixed to provide the desired air-fuel mixture for combustion within the engine 12. Importantly, the charge air supplied to the intake manifold comprises air drawn through an air filter 18 and compressed to a superatmospheric pressure by a compressor 20 of a turbocharger 22. The compressed charge air is coupled to the intake manifold 14 by a suitable conduit 24 which may conveniently include an aftercooler 26 for reducing the temperature level of the charge air.

Combustion of the air-fuel mixture within the engine 12 results in the generation of relatively high temperature exhaust gases. These gases are collected in an exhaust manifold 15, and ducted through a conduit 28 to a turbine 30 of the turbocharger 22. The exhaust gases rotatably drive the turbine 30 before exhausting to atmosphere through exhaust conduits 31 and 32 which may be interrupted by one or more pollution and/or noise abatement devices 34, all in a well-known manner. Importantly, the rotating turbine 30 is coupled to the turbocharger compressor 20 by a common shaft 36 whereby the turbine 30 drives the compressor 20 to provide compressed charge air for the engine.

The turbocharger 22 is preferably sized generally to match the air flow requirements of the engine at maximum or rated relatively high speed operating conditions without providing substantial excess air flow or boost pressure. That is, when the engine is operated at relatively high speed and high load conditions, the volumetric air flow and boost pressure requirements of the engine to maintain speed and load are at a maximum. In this condition of operation, the energy level of exhaust gases expelled from the engine is sufficient to drive the turbocharger 22 whereby the turbocharger compressor 20 provides the necessary air flow and boost pressure. However, when the engine speed drops off to a relatively low level, the energy level of the engine exhaust gases drops correspondingly. The exhaust gas energy level at such low engine speed is insufficient to drive the turbocharger to provide the necessary compressor boost pressure to maintain engine torque. Accordingly, the combustor system 10 comprises a gas turbine for substantial supplementation of the energy level of gases supplied for driving the turbocharger 22 at low engine speeds, whereby compressor boost pressure is maintained at a predetermined level at low engine speeds to maintain engine load carrying capacity.

During relatively high speed engine operation, supplementation of exhaust gas energy level is unnecessary because the turbocharger 22 supplies air flow to the engine generally matching engine consumption capacity. However, as speed drops off, the combustor system operates to maintain turbocharger boost whereby charge air is supplied to the engine in excess of engine consumption capacity. To this end, the combustor system includes a bypass conduit 38 interconnecting the air supply conduit 24 and the exhaust conduit 28 to controllably bypass the excess portion of charge air around the engine 12 to the exhaust conduit for use in supplementing the exhaust gas energy level, as will be hereafter explained. A bypass valve 40 may interrupt the bypass conduit 38 for controllably opening and closing the bypass conduit to gas flow in accordance with engine operating conditions. In one embodiment, the bypass valve 40 comprises a solenoid-type valve which is opened and closed in response to the position of an operator-controlled switch 42, and includes a check valve 44 which prevents the passage of exhaust gases in the exhaust conduit 28 through the bypass conduit 38 to the charge air supply conduit 24. Alternately, if desired, the valve 40 may be automatically responsive to engine parameters such as, for example, engine speed as indicated by the pressure of charge air in the conduit 24. Moreover, in another embodiment, the solenoid portion of the bypass valve 40 may be omitted when the turbocharger 22 is designed generally to provide a charge air output flow matching engine air flow consumption requirements so that excess air for bypassing via the conduit 38 is unavailable at high engine speeds due to engine air flow consumption.

The combustor system 10 includes an auxiliary or supplemental combustor 46 connected in-line with the exhaust conduit 28 downstream of the bypass conduit 38. The combustor 46 is supplied with a suitable fuel, such as diesel fuel, via a fuel line 48. The fuel is mixed in the combustor 46 with gases flowing therethrough which include the exhaust gases and any available charge air bypassing through the conduit 38. The resulting vaporous mixture includes sufficient quantities of oxygen whereby the mixture is ignitable in the combustor 46 to raise the temperature level of the gases passing therethrough, and thereby increase the energy level of the gases available for driving the turbocharger turbine 30 at low engine speed conditions. In this manner, the turbocharger compressor boost pressure is increased to maintain engine load carrying capacity at a relatively high level.

The combustor 46 is configured for in-line passage of the total mixed gas flow consisting of the engine exhaust gases and any available bypass charge air flow. If desired, the combustor 46 further includes an internal mixing chamber (not shown) for further mixing of the exhaust gases and available charge air prior to supply to a combustion chamber within the combustor. The fuel supplied to the combustor is atomized using a portion of the gases flowing through the combustor whereby the fuel and gasses are thoroughly atomized and mixed together to allow sustainment of a flame in the substantially vitiated exhaust gas atmosphere. Importantly, a specific combustor and fuel injector therefor adapted for high quality fuel atomization and sustainment of combustion in a combustor system of this type is shown and described in detail in copending application Ser. No. 855,048 filed Nov. 25, 1977 in the name of R. J. Kobayashi et al, now abandoned.

Fuel for the engine 12 and the combustor 46 is provided from a fuel supply 88 by a fuel pump 90. The pump 90 supplies fuel through a filter 89 to the engine as determined by an engine fuel control 92, such as, for example, a fuel injection system and an operator controlled throttle 94. The pump 90 also supplies fuel through the filter 89 to the combustor 46 as determined by a combustor fuel control 96 with an upstream auxiliary pump 91, flow regulator 93, and a shut-off valve 98. In the preferred embodiment, the combustor fuel control 96 is responsive to engine operation-indicating parameters such as turbocharger boost pressure via a signal conduit 116 to increase the fuel supply to the combustor 46 whenever the boost pressure begins to drop off. Thus, the combustor provides substantial supplementation of the engine exhaust gas energy level for maintaining turbocharger operation at a relatively high speed, and thereby prevents undesirable dropping off of engine torque capacity. While a variety of specific fuel control constructions for the combustor 46 are possible, a fuel control as shown and described in said copending application Ser. No. 855,048 is preferred.

The engine 12 including the turbocharger combustor system 10 is operated as follows. The engine 12 is started in a usual manner, and may be operated as a conventional turbocharged engine without igniting the combustor 46. When it is desired to maintain the compressor boost pressure at a predetermined threshold level to maintain engine torque capacity at low engine speeds, the engine is accelerated at low load to provide substantial boost pressure at or above a threshold level and to provide substantial engine air flow. Then, the combustor fuel control 96 is activated to supply fuel to the combustor 46 in relation to the existing boost pressure, and a suitable igniter (not shown) is used to initiate a combustor flame. At this point, combustor operation continues automatically in response to compressor boost pressure to provide the desired supplemental driving of the turbocharger. More specifically, the fuel control 96 supplies fuel to the combustor 46 generally in inverse proportion to engine speed to provide substantial supplemental driving of the turbocharger 22 at relatively low engine operating speeds, and to substantially eliminate supplemental turbocharger driving at relatively high engine operating speeds. That is, at relatively high engine speed, supplemental driving of the turbocharger is reduced or eliminated because of the ability of the turbocharger to supply the engine 12 with adequate charge air. At high engine speed, bypass charge air around the engine is generally unavailable because of closure of the valve 40 or because of matching of turbocharger outflow with high speed engine air consumption requirements. Nevertheless, sustainment of a small or pilot combustor flame is possible due to the substantial oxygen content of the engine exhaust gases during high speed engine operation. However, as engine speed decreases, fuel supply and bypass charge air flow to the combustor 46 increase to substantially supplementally drive the turbocharger to maintain engine load carrying capacity.

To improve efficiency of operation of the system, the hot gases discharged from the turbocharger turbine 30 pass through the conduit 31 to a regenerative heat exchanger 200. This heat exchanger 200 may comprise either a fixed boundary or a rotary heat exchanger, and includes a flow path for heat exchange passage of the gases. These gases flow out of the regenerative heat exchanger 200 to the exhaust conduit 32 for subsequent passage to atmosphere through the pollution and/or noise abatement devices 34.

The regenerative heat exchanger 200 has a second fluid flow path arranged for passage of any bypass air flowing through the bypass conduit 38. This bypass air thus passes in heat exchange relation with the hot gases exhausted from the turbine 30 to absorb heat energy therefrom. In this manner, substantial heat energy is extracted from the exhausted gases for preheating the bypass air supplied to the exhaust conduit 28 and the combustor 46. Importantly, the mass flow of bypass air through the heat exchanger 200 is normally small compared to the mass flow of exhausted gases whereby the bypass air is substantially preheated by passage through the heat exchanger. With this arrangement, substantially less fuel is required to elevate the energy level of the preheated bypass air and exhaust gases supplied to the combustor 46, resulting in substantial fuel economies.

Use of the regenerative heat exchanger 200 in the combustor system 20 is advantageous in that the exhaust flow through the heat exchanger 200 is continuous regardless of whether bypass air is flowing through the bypass conduit 38. Thus, the heat exchanger 200 is preheated to minimize transients, and to appropriately preheat the bypass air whenever such bypass air is supplied to the combustor 46.

A jet pump 202 is conveniently provided along the length of the exhaust conduit 28, and is powered by preheated bypass air from the regenerative heat exchanger 200. The jet pump 202 is positioned upstream of the auxiliary combustor 46, and includes a downstream directed jet pump nozzle 204 for receiving preheated bypass air via a conduit 206 connected to the bypass conduit 38 upstream of the bypass valve 40. In operation, a portion of the available bypass air is directed through the nozzle as indicated, and serves to accelerate exhaust gas flow in the conduit 28 and thereby decrease the pressure in said conduit. This correspondingly increases the pressure differential across the engine 12 so that the engine operates more efficiently with less backpressure, as well as improves mixing between the bypassed charge air and the engine exhaust gases.

A control valve 208 is connected along the conduit 206 to control flow of bypass air to the jet pump 202. This control valve 208 is responsive to engine operating conditions to activate and de-activate the jet pump as needed. More specifically, the control valve 208 may be made responsive to a suitable engine speed and/or load indicating signal such as a pneumatic compressor discharge pressure level signal supplied via conduit 116. The control valve 208 may be set to open the conduit 206 when the pressure level drops below a predetermined threshold, and this setting conveniently may coincide with operation of the combustor fuel control 96 and the switch 42 for closing the bypass valve 40.

A wide variety of modifications of the combustor system of this invention are believed to be within the skill of the art. Accordingly, no limitation on the invention described herein is intended except by way of the appended claims.

What is claimed is:

1. In an internal combustion engine having a turbocharger turbine driven by exhaust gases to drive a turbocharger compressor to provide compressed charge air to the engine, a combustor system comprising a combustor coupled between the engine and the turbocharger for in-line passage of engine exhaust gases;
   means for controllably supplying fuel to the combustor to permit combustor operation with sustained combustion of the fuel to supplement the energy level of gases passing through the combustor;
   means for selectively and intermittently bypassing a portion of the turbocharger charge air flow around the engine to the combustor in response to engine operating conditions;
   a jet pump connected between the engine and the turbocharger in-line with said combustor; and
   conduit means communicating between said bypass means and said jet pump for driving said jet pump with a portion of the bypassed charge air.

2. A combustor system as set forth in claim 1 wherein said jet pump is mounted upstream of said combustor.

3. A combustor system as set forth in claim 2, wherein said bypass means includes a bypass conduit and a bypass valve for opening and closing said bypass conduit to charge air flow, said valve being responsive to engine operating conditions to close for at least some conditions of combustor operation; and wherein said bypass conduit terminates downstream of said jet pump.

4. A combustor system as set forth in claim 3 including valve means for controlling bypass air flow through said jet pump in response to engine operating conditions.

5. A combustor system as set forth in claims 1, 2 3 or 4 including: a heat exchanger arranged for passage of gases discharged from the turbocharger turbine in heat exchange relation with the bypassed charge air to preheat the same prior to supply thereof to said combustor.

6. A combustor system as set forth in claim 1 including means for mixing available bypass air flow with exhaust gases upstream of said combustor.

7. A combustor system as set forth in claim 1 wherein said fuel supply means comprises a fuel source; means for pumping fuel from said fuel source; and
   a combustor fuel control responsive to engine speed and load for reducing the supply of fuel to the combustor with increases in engine speed and load.

8. A combustor system as set forth in claim 7 wherein said combustor fuel control includes means responsive to charge air pressure.

9. A combustor system as set forth in claim 8 wherein said bypass means includes a bypass conduit and a bypass valve for opening and closing said bypass conduit to charge air flow, said valve being responsive to engine operating conditions to close for at least some conditions of combustor operation.

10. An internal combustion engine having a turbocharger turbine driven by exhaust gases to drive a turbocharger compressor to provide compressed charge air to the engine, a combustor system comprising a combustor coupled between the engine and a turbocharger for in-line passage of exhaust gases;
   means for controllably supplying fuel to the combustor to permit combustor operation with sustained combustion of the fuel to supplement the energy level of the gases passing through the combustor comprising means for pumping fuel from a source of fuel to the combustor and a combustor fuel control responsive to engine speed and load for reducing the supply of fuel to the combustor with increases in engine speed and load wherein said combustor fuel control includes means responsive to charge air pressure;
   means for selectively and intermittently bypassing a portion of the turbocharger charge air flow around the engine to the combustor in response to engine operating conditions comprising a bypass conduit and a bypass valve for opening and closing said bypass conduit to charge air flow, said valve being responsive to engine operating conditions to close for at least some conditions of combustor operation;
   means for mixing available bypass air flow with exhaust gases upstream of said combustor;
   jet pump means connected between the engine and the turbocharger in line with the combustor and upstream of both the combustor and the terminal end of the bypass means;
   conduit means communicating between the bypass means conduit and the jet pump for driving the jet pump with a portion of the bypass charge air; and
   valve means for controlling bypass air flow through said jet pump in response to engine operating conditions.

* * * * *